United States Patent [19]

Cornell

[11] 4,126,918

[45] Nov. 28, 1978

[54] CABLE-CLAMPING DEVICE WITH ADJUSTING MEANS

[75] Inventor: Paul A. Cornell, Knockanore, Ireland

[73] Assignee: Electro-Clamp Corporation, Beverly Hills, Calif.

[21] Appl. No.: 774,461

[22] Filed: Mar. 4, 1977

Related U.S. Application Data

[63] Continuation of Ser. No. 629,691, Nov. 7, 1975, abandoned.

[51] Int. Cl.² ............................................. F16G 11/00
[52] U.S. Cl. ............................ 24/132 R; 24/132 AB; 339/266 R; 339/274
[58] Field of Search ............. 339/266 R, 274, 266 F, 339/266 G, 266 L; 24/132 AA, 132 AB, 132 AC, 132 LS, 132 WL, 249 SA, 115 G

[56] References Cited

U.S. PATENT DOCUMENTS

| 1,496,603 | 6/1924 | Rothenberger | 339/274 |
| 2,074,393 | 3/1937 | Hixon | 339/274 |
| 2,159,153 | 5/1939 | Hixon | 339/274 |
| 2,182,896 | 12/1939 | Hixon | 339/274 |
| 2,264,754 | 12/1941 | Hixon | 339/274 |

Primary Examiner—Bernard A. Gelak
Attorney, Agent, or Firm—Robert L. Harmon

[57] ABSTRACT

A cable clamping device of the rotary jaw type is provided with means for adjusting its cable-receiving and cable-clamping capabilities. The adjustment means permits selective adjustment of the effective cable-receiving or cable-clamping dimension of the clamp. For example, the male member of the rotary jaw clamp is fitted with a rotatable sleeve which has an internal bore having a longitudinal axis angularly displaced from the axis of the sleeve. Rotation of the sleeve results in a change in the size of the cable-receiving and cable-clamping bore of the clamp.

18 Claims, 7 Drawing Figures

CABLE-CLAMPING DEVICE WITH ADJUSTING MEANS

CROSS-REFERENCE TO RELATED APPLICATION

This application is a continuation of my co-pending application Ser. No. 629,691, filed Nov. 7, 1975, for "Cable Clamping Device With Adjusting Means", now abandoned.

BACKGROUND AND SUMMARY OF THE INVENTION

The present invention relates generally to clamping devices for use in the securement of cables, wires and the like. More specifically, the invention relates to a cable-clamping device of the rotary jaw type which includes means for adjusting the size of the cable-receiving bore thereof to thereby provide variable clamping capability.

Although cable-clamping devices of the rotary jaw type are well known in the art and have met with considerable success, the conventional rotary jaw clamps suffer from the disadvantage of being suitable for use with only a single size cable. This is due to the fact that a relatively specific range of clamping forces is necessary to properly secure a given cable without developing shear forces which might cause failure of the clamp. Thus, specific size prior art clamps are typically recommended for use with a cable of specified diameter.

Accordingly, the present invention is directed to an improved cable-clamping device of the rotary jaw type which includes means for adjusting the cable-receiving and cable-clamping capability of the device to unable the use thereof with cables of varying diameters. More specifically, the adjustable means is capable of altering the spatial relationship of the effective cable-receiving axes of the cable-receiving bores or openings in the female and male jaws, thereby altering the cable-receiving or cable-clamping capability of the device. In other words, the adjustable means serves to alter or offset the general alignment of the bores when the device is in its open, cable-receiving position, or to alter the offset of the bores when the device is in its closed, cable-clamping position. For example, one embodiment of the present invention includes a rotary jaw cable clamp which utilizes a means to adjust the alignment of the cable-receiving bore of the male member. The adjusting means may be used with a conventional, prior art clamp or with an improved clamp embodying preferred structural features which enhance and simplify the assembly and use of the device. In addition, the adjustable clamp of the present invention is designed so as to retain most, if not all, of the structural and functional features and advantages of prior art rotary jaw clamping devices.

BRIEF DESCRIPTION OF THE DRAWINGS

The novel features which are characteristic of the present invention are set forth with particularity in the appended claims. The invention itself, however, together with further objects and attendant advantages thereof, will be better understood by reference to the following description, taken in connection with the accompanying drawings, in which:

DETAILED DESCRIPTION OF THE INVENTION

Figure 1:
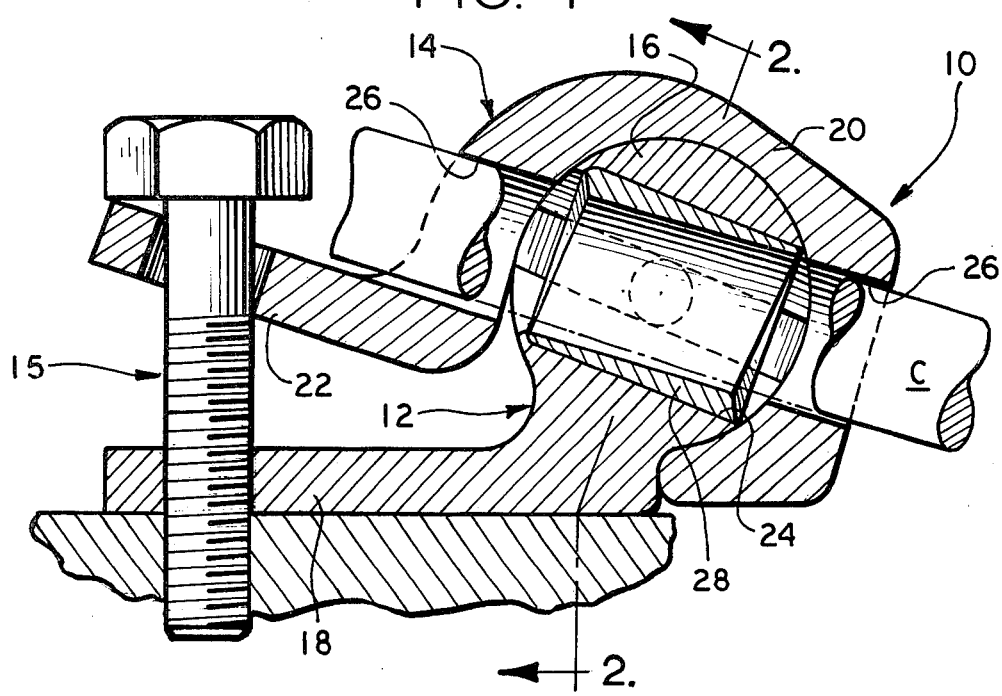
FIG. 1 is a side elevational view, in partial cross section, illustrating a preferred embodiment of the present invention in the open, cable-receiving position.
Figure 2:
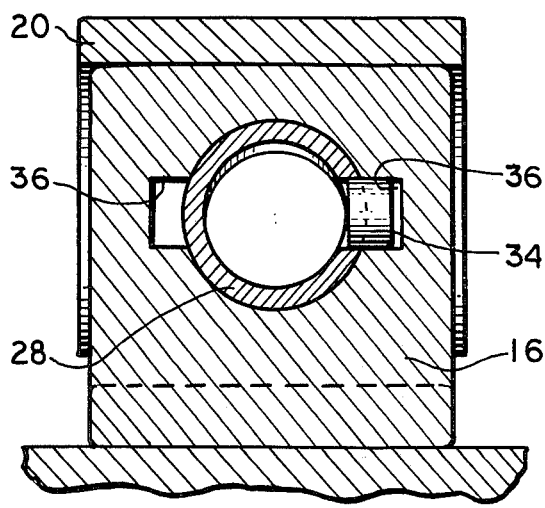
FIG. 2 is a cross-sectional view taken along line 2—2 of FIG. 1.

Referring now to FIG. 1, a cable clamp, designated generally as 10, is shown which embodies the principal features of the present invention. The clamp 10 includes a male member 12, a female member 14, and a means 15 to effect rotational movement of the two members. The male member includes a generally cylindrical male head 16 and a mounting tail 18 extending therefrom. The female member includes a generally C-shaped coupling sleeve 20 and a mounting tail 22 extending therefrom. The male head 16 and the coupling sleeve each have a cable-receiving bore, 24 and 26 respectively, which are aligned in the open position of the clamp to receive the cable C, but are offset in the closed position (see, for example, FIG. 3), to effect the necessary cable-clamping forces.

In accordance with the present invention the clamp 10 is provided with means to adjust the cable-receiving and cable-clamping capability thereof to enable the use of the clamp 10 with cables of varying diameters.

In accordance with the preferred embodiment of the invention, the clamp 10 includes an adjustment sleeve 28 disposed within the male bore 24. As can best be seen in FIGS. 5 and 5a, the sleeve 28 has an external surface 30 and an internal cylindrical bore 32. The longitudinal axis A of the bore 32 is angularly displaced from the axis B of the sleeve 28 such that rotation of the sleeve about its longitudinal axis B will result in a change in the orientation of the bore 32 relative to the male bore 24 and the female bore 26. In this manner the alignment of the male bore 24 may be changed to receive and properly secure cables of different diameters.

Figure 3:
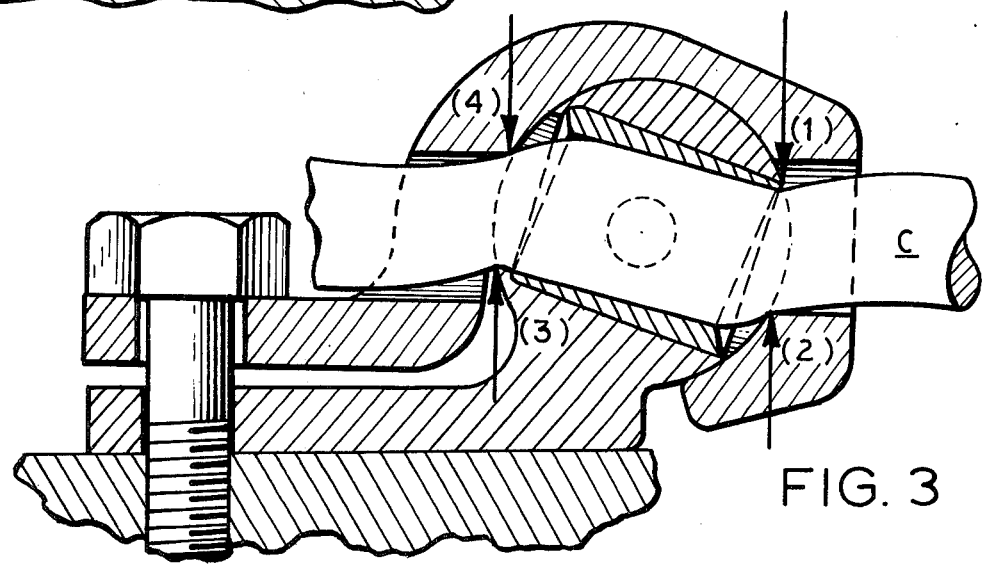
FIG. 3 is a side elevational view showing the cable-clamping device of the present invention in the closed, cable-clamping position.
Figure 4:
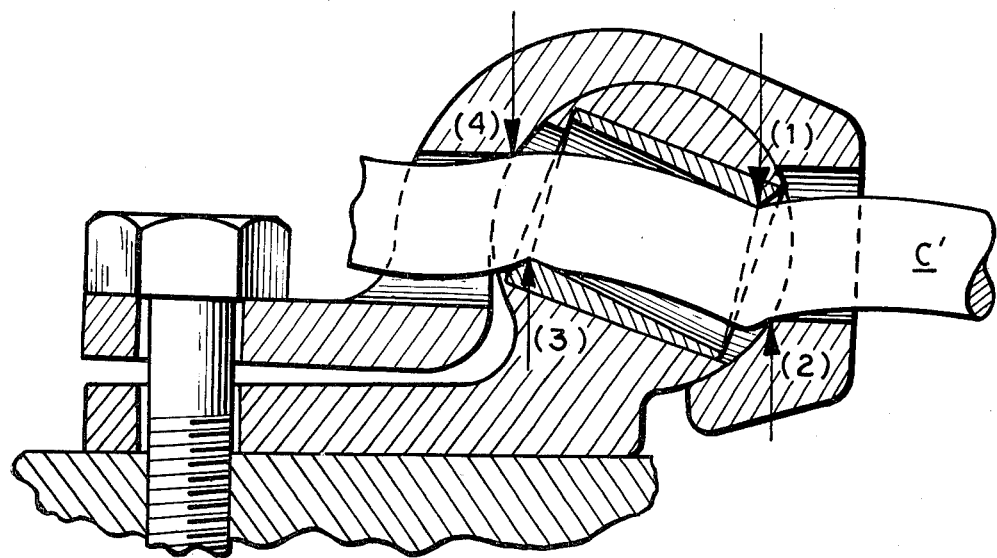
FIG. 4 is a view similar to that of FIG. 3, illustrating the use of the cable-clamping device with a cable of relatively small diameter.

It will be apparent to those skilled in the art from the foregoing description that cable clamps constructed in accordance with present invention will accomodate at least two cables of different diameters. Thus, with the adjustment sleeve positioned as is shown in FIGS. 1 and 3, a cable C having a relatively large diameter may be received and properly secured; yet with the adjustment sleeve rotated 180° about its axis B, as shown in FIG. 4, the same clamp may receive and properly secure a cable C' having a relatively small diameter.

In order to facilitate the assembly and adjustment of the clamp 10, the sleeve 28 may include means for indexing the position thereof relative to the male bore 24. Accordingly, a radially extending protuberance 34 may be provided on sleeve 28 which engages one of a plurality of slots 36 located along the male bore 24. The protuberance, which may take the form of a pin or ridge, will prevent the rotational displacement of the sleeve 28 once it has been assembled within the male head. Similarly, the sleeve 28 and the male bore 24 may have cooperative transverse cross-sectional configurations, i.e., oval or rectangular, which will allow indexing of the sleeve and prevent its rotational displacement. In addition, the slots 36 and the protuberance or pin 34 may be arranged to properly position the sleeve 28 longitudinally within the male head. Thus, the slots 36 may terminate intermediate the male bore 24 to form a shoulder 38 which will cooperate with the pin 34. Alternatively, the male bore 24 may have a portion 24' with enlarged diameter and a second portion 24" with a narrowed diameter such that a shoulder 40 is formed to provide means for longitudinal positioning of the sleeve 28.

Figure 5:
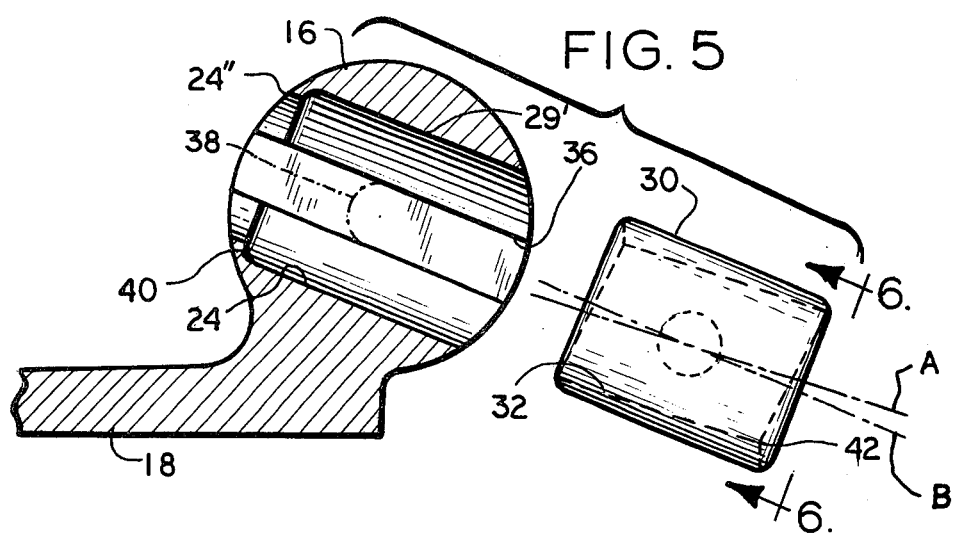
FIG. 5 is an exploded side elevational view, in partial cross section, illustrating in greater detail the preferred structural features of one embodiment of the present invention.
Figure 6:
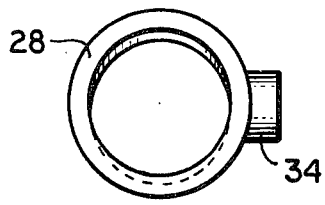
FIG. 6 is a cross-sectional view taken along line 6—6 of FIG. 5.
Figure 5A:
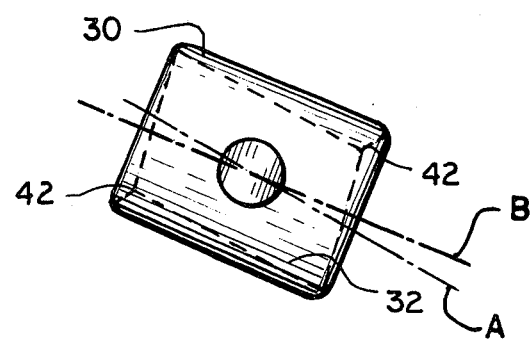
FIG. 5a side elevational view showing the sleeve of FIG. 5 rotated 180° about its longitudinal axis.

It is also preferred that the ends of the adjustment sleeve 28 be beveled, as at points 42 in FIG. 5 and 5a, to facilitate the insertion of the cable, and particularly stranded cable, into the open clamp.

In the operation of the present invention, the female member 14 of the clamp 10 will have a predetermined degree of rotation on the male member 12 from the open to the closed positions. This rotation, together with the size of the cable-receiving bores will determine the size cable which may be properly used with a particular clamp. In order to adjust the size of the cable-receiving bore, the sleeve 28 may be positioned as shown in either FIG. 3 or FIG. 4. In the arrangement shown in FIG. 3 the distance between pressure surfaces 1 and 2 in the front portion of the clamp and pressure surfaces 3 and 4 in the rear portion of the clamp will be greater than the distances between these respective pressure surfaces in the arrangement shown in FIG. 4. Accordingly, a larger cable may be suitably secured in a clamping device with the sleeve positioned as shown in FIG. 3, as compared with a clamp having the sleeve positioned as shown in FIG. 4.

Of course, a number of different adjustment sleeves might be utilized with a given clamp, thereby increasing the number of different size cables which may be secured. In addition, the various adjustment sleeves may have walls of differing thicknesses or internal bores of differing degrees of angular displacement. Thick walled sleeves will accomodate cables of smaller diameters, and thin walled sleeves will accomodate cables of larger diameter. Sleeves having an internal bore with an axis A having a relatively large angular displacement will allow the clamp to be used with cables of greater size differentials. In this manner, any number of different size cables could be secured with a common male and female member.

In addition, an adjustment sleeve or other indexable insert may be utilized in one or the other, or both sides, of the female bore 26, with or without a sleeve or insert in the male bore 24. Moreover, the inserts need not be externally or internally cylindrical. For example, the insert 28 could be of square or hexagonal external shape, and could define a cable-receiving opening of other than circular cross-section, such as a truncated circle or a polygonal cross-section. Nor need the effective cable-receiving axis of the insert be angularly displaced from the axis of the bore with which it is associated, or the axis of external symmetry of the insert itself; translatory displacement of the effective cable-receiving axis of the insert will also permit the desired adjustment of the cable-receiving and/or -clamping capability of the device.

Indeed, the principal feature of the present invention is the ability to alter, by adjustment of some portion of the device, the spatial relationship of the effective cable-receiving axes of the male and female cable-receiving openings, either when the device is in its open cable-receiving position or its closed cable-clamping position. For example, in the device shown in the drawings, the cable-receiving openings are in general alignment and the effective cable-receiving axes of the openings are in general registry when the device is in its open cable-receiving position and the sleeve 28 is positioned as shown in FIG. 1. When the sleeve 28 is rotated to the position shown in FIG. 4, and when the clamp is again opened to its cable-receiving position, the spatial relationship of the axes of the cable-receiving openings defined by the sleeve 28 and the female bore 26 will have been altered by an angular displacement. The same result could be accomplished with inserts in the female bore 26. Similarly appropriate inserts could be associated with either the female or male bores to effect a translatory displacement of the effective cable-receiving axes.

Thus, adjustable means, such as the sleeve 28, are provided to permit selective alteration of either the general alignment of the cable-receiving openings when the clamp is open, or of the clamping offset of the openings when the clamp is closed, thereby changing the cable-receiving or -clamping capability of the device.

It should be understood that various changes and modifications to the preferred embodiments disclosed herein will be apparent to those skilled in the art. For example, the bolt 15 used to effect rotational movement of the male and female members is shown merely for illustrative purposes, and other rotation means will be apparent to those skilled in the art. Such changes and modifications can be made without departing from the spirit and scope of the present invention and without diminishing its attendant advantages. It is, therefore, intended that such changes and modifications be covered by the appended claims.

I claim:

1. A cable-clamping device of the rotary jaw type comprising:
   a male member including a generally cylindrical head and a mounting tail extending therefrom, said male head having a cable-receiving bore;
   a female member including a coupling sleeve and a mounting tail extending therefrom, said sleeve having a cable-receiving bore;
   said female member adapted to receive said male member and rotate thereon between open and closed positions, said male and female bores being generally aligned in the open position to receive a cable and offset in the closed position to effect cable-clamping forces; and
   an adjustment sleeve disposed within the male bore for adjusting the cable-receiving and cable-clamping capability of the device to enable the use thereof with cables of varying diameters, said sleeve including an internal cylindrical bore the longitudinal axis of which is angularly displaced from that of said adjustment sleeve.

2. The cable-clamping device of claim 1 including means for indexing the rotational position of said adjustment sleeve within said male bore to accomodate cables of varying diameters.

3. The cable-clamping device of claim 1 wherein said adjustment sleeve includes at least one radially extending protuberance and said male bore includes a plurality of axial slots whereby said adjustment sleeve may be disposed at different positions to accomodate cables of different diameters.

4. The cable-clamping device of claim 3 wherein said protuberance and said slots are arranged to provide both rotational and longitudinal positioning of said adjustment sleeve within said male bore.

5. In a cable-clamping device of the rotary jaw type, said device including male and female members each having a cable-receiving bore and said female member adapted to receive and rotate on said male member between an open, cable-receiving position and a closed, cable-clamping position, the improvement comprising:
means disposed within the male bore for adjusting the cable-receiving and cable-clamping capability of the device, comprising an adjustment sleeve which includes an external surface in operative engagement with said male bore and an internal cylindrical bore the longitudinal axis of which is angularly displaced from that of said adjustment sleeve.

6. The improved cable-clamping device of claim 5 wherein said adjusting means includes means for indexing the rotational displacement of said adjustment sleeve within said male bore to accomodate cables of varying diameters.

7. A cable-clamping device comprising:
a male member having means defining a cable-receiving opening therein;
a female member having means defining a cable-receiving opening therein;
said female member being mounted on said male member for relative rotation about an axis transverse to the cable axis and passing through the cable-receiving opening of said male member such that the cable will be received in said openings when said device is open and clamped by said means when said device is closed;
the effective cable-receiving axes of said openings having a fixed spatial relationship to one another when said device is in its open position;
wherein at least one of said means is adjustable to alter the spatial relationship of said axes in said open position thereby altering the cable-clamping or - receiving capability of said device.

8. A device as defined in claim 7, wherein said adjustable means is capable of altering the angular relationship of said axes.

9. A device as defined in claim 7, wherein said adjustable means is capable of altering the translatory relationship of said axes.

10. A cable-clamping device comprising:
a male member having means defining a cable-receiving opening therein;
a female member having means defining a cable-receiving opening therein;
said female member being mounted on said male member for relative rotation about an axis transverse to the cable axis and passing through the cable-receiving opening of said male member such that the cable will be received in said openings when said device is open and clamped by said means when said device is closed;
the effective cable-receiving axes of said openings having a fixed spatial relationship to one another when said device is in its closed position;
wherein at least one of said means is adjustable to alter the spatial relationship of said axes in said closed position thereby altering the cable-clamping or - receiving capability of said device.

11. A device as defined in claim 10, wherein said adjustable means is capable of altering the angular relationship of said axes.

12. A device as defined in claim 10, wherein said adjustable means is capable of altering the translatory relationship of said axes.

13. A cable-clamping device of the rotary jaw type comprising:
a male member having a cable-receiving bore therethrough;
a female member having a cable-receiving bore;
said female member adapted to receive said male member and rotate thereon between open and closed positions about an axis of rotation which is transverse to the axis of the cable and passes through the cable-receiving bore of said male member, said male and female bores being generally aligned in the open position to receive the cable and offset in the closed position to effect cable-clamping forces; and
adjustable means in at least one of said bores for selectively altering said offset in the closed position.

14. The device of claim 13 wherein said means comprises an indexable insert in said female bore.

15. The device of claim 13 wherein said means comprises an indexable insert in said male bore.

16. A cable-clamping device of the rotary jaw type comprising:
a male member having a cable-receiving bore therethrough;
a female member having a cable-receiving bore;
said female member adapted to receive said male member and rotate thereon between open and closed positions about an axis of rotation which is transverse to the axis of the cable and passes through the cable-receiving bore of said male member, said male and female bores being generally aligned in the open position to receive the cable and offset in the closed position to effect cable-clamping forces; and
adjustable means in at least one of said bores for selectively offsetting said general alignment in the open position.

17. The device of claim 16 wherein said means comprises an indexable insert in said female bore.

18. The device of claim 16 wherein said means comprises an indexable insert in said male bore.

* * * * *